(12) United States Patent
Hiner et al.

(10) Patent No.: US 8,808,416 B2
(45) Date of Patent: Aug. 19, 2014

(54) FILTRATION SYSTEM AND METHOD OF DESIGN

(75) Inventors: Steve David Hiner, Salisbury (GB); Paul Richardson, Waterlooville (GB); Paul Bryant, Amesbury (GB)

(73) Assignee: BHA Altair, LLC, Franklin, TN (US)

( * ) Notice: Subject to any disclaimer, the term of this patent is extended or adjusted under 35 U.S.C. 154(b) by 395 days.

(21) Appl. No.: 13/245,961

(22) Filed: Sep. 27, 2011

(65) Prior Publication Data
US 2012/0079942 A1 Apr. 5, 2012

(30) Foreign Application Priority Data

Sep. 30, 2010 (GB) .................................. 1016441.6

(51) Int. Cl.
| | | |
|---|---|---|
| B01D 46/00 | (2006.01) | |
| B01D 39/16 | (2006.01) | |
| B01D 39/18 | (2006.01) | |
| B01D 39/20 | (2006.01) | |
| B01D 46/02 | (2006.01) | |
| B01D 46/54 | (2006.01) | |

(52) U.S. Cl.
CPC .......... *B01D 46/002* (2013.01); *B01D 46/0021* (2013.01); *B01D 39/1623* (2013.01); *B01D 39/18* (2013.01); *B01D 39/2017* (2013.01); *B01D 46/0068* (2013.01); *B01D 46/023* (2013.01); *B01D 46/546* (2013.01); *B01D 2239/025* (2013.01); *B01D 2239/064* (2013.01); *B01D 2239/1291* (2013.01); *B01D 2267/40* (2013.01); *B01D 2279/60* (2013.01)
USPC .............................................. 55/484; 95/286

(58) Field of Classification Search
CPC ............. B01D 46/002; B01D 2267/40; B01D 2279/60; B01D 46/0021
USPC ................................................ 95/286; 55/484
See application file for complete search history.

(56) References Cited

U.S. PATENT DOCUMENTS

| | | | | |
|---|---|---|---|---|
| 5,391,212 | A * | 2/1995 | Ernst et al. ................... | 55/385.3 |
| 6,312,489 | B1 * | 11/2001 | Ernst et al. ................... | 55/385.3 |
| 7,637,976 | B2 * | 12/2009 | Dirnberger et al. .......... | 55/385.3 |
| 8,007,555 | B2 * | 8/2011 | Lack ............................... | 55/483 |
| 8,105,411 | B2 * | 1/2012 | Gajjar et al. .................... | 55/486 |
| 8,211,197 | B2 * | 7/2012 | Srinivasan et al. ........... | 55/385.3 |
| 8,241,382 | B2 * | 8/2012 | Pham et al. ..................... | 55/484 |
| 8,377,163 | B2 * | 2/2013 | Srinivasan et al. ........... | 55/385.3 |
| 8,425,645 | B2 * | 4/2013 | Pham et al. ..................... | 55/484 |
| 2009/0241490 | A1 | 10/2009 | Lack | |
| 2011/0315015 | A1 * | 12/2011 | Jarrier et al. ..................... | 95/280 |

FOREIGN PATENT DOCUMENTS

| | | | |
|---|---|---|---|
| EP | 0787519 | A2 | 8/1997 |
| GB | 2454306 | A * | 5/2009 |
| JP | 2002336615 | A | 11/2002 |

OTHER PUBLICATIONS

GB Search Report issued in connection with GB patent Application 1016441.6 on Jan. 6, 2011 filed Sep. 30, 2010.

\* cited by examiner

*Primary Examiner* — Robert Clemente
(74) *Attorney, Agent, or Firm* — Reinhart Boerner Van Deuren P.C.

(57) ABSTRACT

A filtration system comprising at least one filter element, at least a first and a second filter media that are different to one another and are arranged in a parallel relationship, wherein fluid flow through the filtration system comprises a first fluid flow portion that flows through the first media and a second fluid flow portion that flows through the second media.

15 Claims, 8 Drawing Sheets

FILTRATION SYSTEM AND METHOD OF DESIGN

BACKGROUND OF THE INVENTION

1. Field of the Invention

The field of the invention relates to filtration systems. In particular, the field of the invention relates to systems suitable for use in gas turbines for filtering inlet air to remove contaminants therefrom, across a variety of conditions.

2. Description of Related Art

Filter systems for gas turbine inlet air are known. Power generation equipment such as gas turbine engines use a large supply of intake air to enable combustion. To maintain suitable performance and reliability of the turbine the intake air is filtered to remove unwanted dust, moisture and other contaminants. Filters are generally subject to accumulation of particulates on and in the filter media over time, which adversely increases resistance to flow through the filters. Often, back-pulsing of air is used to clean the filters intermittently.

Various filter media are known for filtering inlet air and they are generally tailored to optimise filtration of specific contaminants and to take into account geographic or environmental conditions. Gas turbines are used across a wide variety of environments, for example from deserts to offshore platforms.

Filtration system design often requires a tradeoff between performance parameters, usually between pressure loss, filter life, and efficiency, although other parameters such as performance in moist or humid conditions also play a part. These parameters usually compete against each other, i.e. higher filtration efficiency usually requires a higher pressure loss across the media, reducing the producible energy as a function of the induced air. Known approaches to addressing complex filtration performance requirements include the use of multiple filtration stages and/or the use of multiple layers of filtration media. The pressure loss over each filtration stage is additive. Thus an improved filtration system and method of designing such is required.

BRIEF SUMMARY OF THE INVENTION

Embodiments of the present invention provide a filtration system comprising at least one filter element; at least a first and a second filter media that are different to one another and are arranged in a parallel relationship wherein fluid flow through the filtration system comprises a first fluid flow portion that flows through the first media and a second fluid flow portion that flows through the second media.

In a further embodiment, a method of optimising performance of a filtration system is provided. The method comprising providing at least one filter element; providing at least a first and a second filter media that are different to one another; and arranging the first and second filter media in parallel, wherein fluid flow through the filtration system comprises a first fluid flow portion that flows through the first media and a second fluid flow portion that flows through the second media.

An additional embodiment of the present invention provides a gas turbine comprising an inlet for receiving air and a filtration system through which the air is filtered, the filtration system comprising at least one filter element; at least a first and a second filter media that are different to one another and are arranged in a parallel relationship, wherein fluid flow through the system comprises a first fluid flow portion that flows through the first media and a second fluid flow portion that flows through the second media.

There follows a detailed description of embodiments of the invention by way of example only with reference to the accompanying drawings.

DETAILED DESCRIPTION OF THE INVENTION

Filtration efficiency is defined in terms of the percentage of contaminant particles removed from a flow of fluid by a filter as a function of particle size distribution. Efficiency may increase during use as particulates build up on and in the filter media, but pressure loss increases correspondingly. The life of a filter is defined as the time it takes to load the filter with an amount of contaminant sufficient to give rise to a given pressure loss across the filter. In one example, the maximum acceptable pressure loss is 3 inches of water gauge (623 Pa). The filter life may be further characterized by the occurrence of a sharp increase in pressure drop across the filter.

Figure 1:
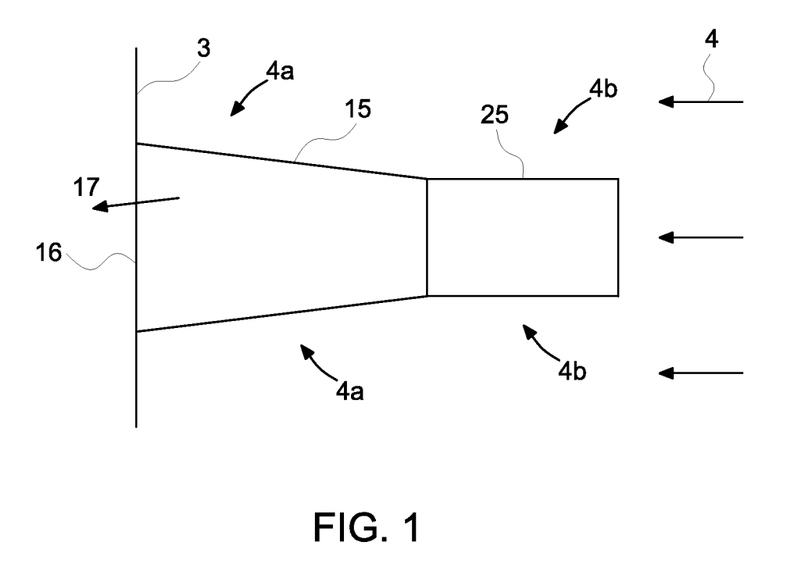
FIG. 1 is a cross-sectional view of an embodiment of the invention.

In the embodiment shown in FIG. 1, a first filter 15 has a first media and a second filter 25 has a second media. The first filter is a cone and the second filter is a cylinder. Arrows 4 show the direction of incoming airflow. The cone filter element 15 is connected to a tubesheet 3, which holds the filters in place and the cylinder filter 25 is disposed at the front end of the cone filter. In practice, a plurality of filter elements can be connected to the tubesheet 3 in an array, either directly or via an intervening structure.

The fluid flow 4 comprises a first portion 4a that flows through the first filter media and a second portion 4b that flows through the second media. The first and second media are arranged in parallel, thus defining separate flow paths for the flow portions 4a,b. The first portion 4a does not pass through the second media and the second portion 4b does not pass through the first media.

The filtration system includes a housing (not shown) and a frame not shown) that is used to support the tubesheet 3 and the housing. The tubesheet 3 includes at least opening 16, through which fluid flows. The filter 15 is mounted adjacent to respective opening 16 at an upstream side of the tubesheet 3.

Fluid, typically atmospheric air, is taken in by the filtration system and is cleaned by the filters 15,25. The cleaned air flows downstream from the openings 16 in the tubesheet 3 as indicated by an arrow 17 into a downstream use component, such as a gas turbine for power generation. Each of the illustrated filter elements 15,25 includes at least one filter media to clean the air before it is used by components located downstream of the filters.

Various filter elements can be used for filtering inlet air, such as cones, cylinders, barriers, pockets, bags and screens for example and embodiments of the present invention are applicable to any type of filter element.

Advantageously, embodiments of the filtration system according to the invention can provide a synergy between the different types of media. In one embodiment, in comparison to the second media the first media has high efficiency, long life and poor pressure loss performance in moist conditions when dirty, eg due to build-up and swelling of particulates. A filter can be considered to be dirty to the extent that it has been in use and experienced some level of build-up of contaminants on and/or in the filter media. In comparison to the first media the second media has lower efficiency, short life but good pressure loss performance in moist conditions and when dirty. In one embodiment the first media is disposed in a cone type filter element, and the second media can be disposed in a different type of filter element, eg a cylinder filter. The overall life of the filtration system according to this embodiment is greater than the mean average of the different media, and is advantageously close to that of the first media, while the pressure loss in moist conditions and when dirty is comparable to the second media. Thus, filtration systems embodying the invention are capable of combining the benefits of different types of media whilst significantly avoiding the disadvantageous properties of the media.

Embodiments of the invention further provide the advantage of a simple and low risk solution utilising a combination of different filter media types into a single filtration stage. The prior art approach of developing an entirely new media involves an inherent commercial risk that the new media will not fulfil the desired properties, and combining media in parallel in accordance with the embodiments of the invention avoid such development risks.

In one embodiment the first filter media includes nano media technology to provide long life and high efficiency with respect to particulate removal, but its reaction to moisture when dirty is poor. For example, if exposed to very high humidity and/or fog after some dust has accumulated on the filter, the first media may develop very high pressure drop across the filter. An example of such a media is solution-spun nylon based nano fibre adhered to the surface of a spunbond polyester substrate. This media acts primarily as a surface-loading filter, i.e. contaminants build up primarily on the surface rather than within the media. The media may be subjected to any number of treatments known in the art. In one embodiment the media has been subjected to hydrophobic treatment. A nano fibre is defined as a fibre having a diameter less than 1 micron.

The second filter media includes a different media technology to the first filter media. In one embodiment the second media provides good performance in moist conditions when dirty, but does not have nano media and so has a lower life and lower efficiency in terms of filtering particulates. An example of the second media is wet laid layered nonwoven material comprising polymer and glass synthetic fibres. The second media acts primarily as a depth-loading filter, i.e. contaminants are captured throughout the depth of the media.

Figure 2A:
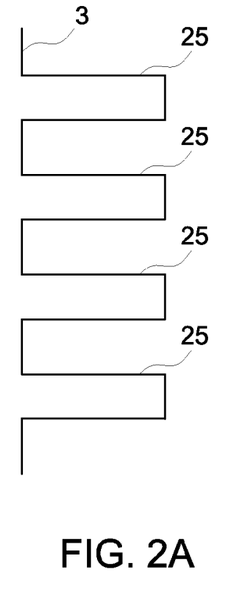
FIGS. 2A and 2B are cross-sectional views of embodiments of the invention.
Figure 2B:
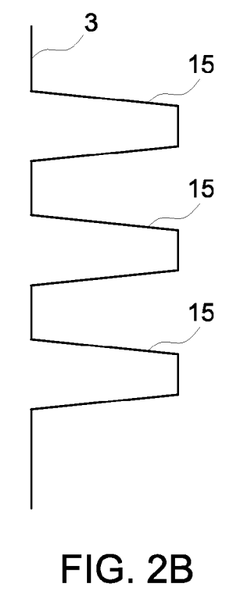

Embodiments of the invention are applicable to many different arrangements of filter elements. For example, the filter elements 15,25 do not have to be mounted to each other and can be connected to the tubesheet 3 separately. Often, multiple filters are provided in a bank of filters forming a filter house to filter large airflows. FIG. 2A shows an example, wherein cylinder filter elements 25 are mounted to the tubesheet 3 to form an array of cylinders 2. FIG. 2B shows an alternative example wherein a plurality of cone filter elements 15 are mounted to the tubesheet 3. For the purposes of the embodiments of the present invention, the choice of media can be made independently of the choice of filter element.

The number of each type of filter element and the relative amounts and types of filter media provided therein can be chosen by the skilled person as seen fit for each particular application. An equal distribution of media can be used. For example, in a filter bank holding 100 filter elements, it is possible to have 50 filter elements (eg cones) using the first filter media and 50 filter elements (eg cylinders) using the second media. Alternatively, a non-equal distribution of media can be used. In arid areas where the intake of moisture is not so problematic, it is possible to provide a filtration system having a non-equal distribution of the media such that it includes more of the first media, which has high particulate efficiency, eg. 70 filter elements having the first media and 30 filter elements having the second media.

Figure 3:
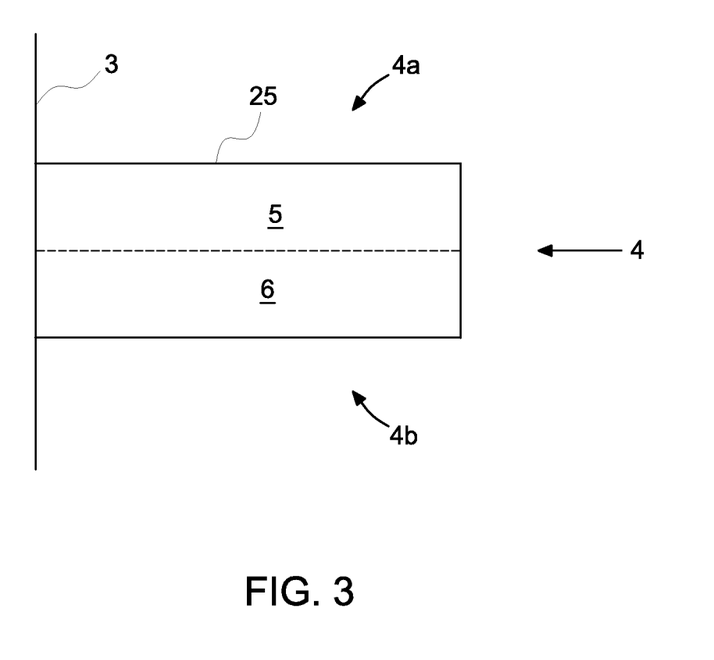
FIG. 3 is a cross-sectional view of an embodiment of the invention.
Figure 4:
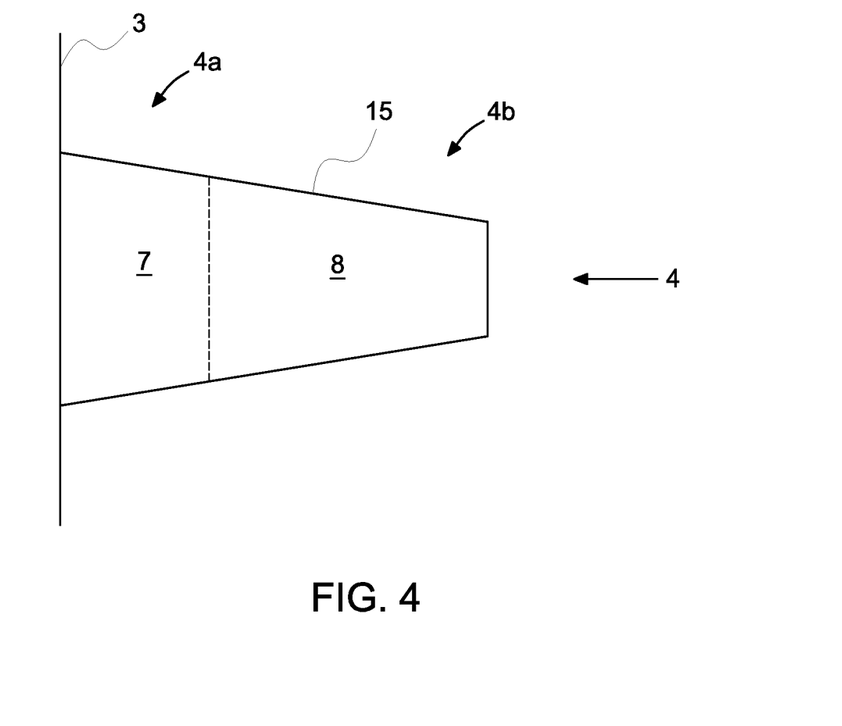
FIG. 4 is a cross-sectional view of an embodiment of the invention.

As well as providing different media in parallel in separate filter elements, as in FIGS. 1 and 2, it is also possible to provide multiple filter media in parallel within a single filter element. An example is shown in FIG. 3, wherein the cylinder filter 25 comprises two distinct regions of different media 5, 6. In the example shown, the regions define an upper section 5 and a lower section 6 which can be connected together by sewing or laminating for example. An alternative arrangement is shown in FIG. 4, wherein two distinct regions of a cone filter have different filter media 7,8 in a rearward region and a forward region respectively. Alternatively, the media can define left and right regions as viewed from a direction perpendicular to the tubesheet 3. As with the other embodiments, the first 4a and second 4b portions of the fluid flow 4 pass respectively through the first 5,7 and second 6,8 media.

Figure 5:
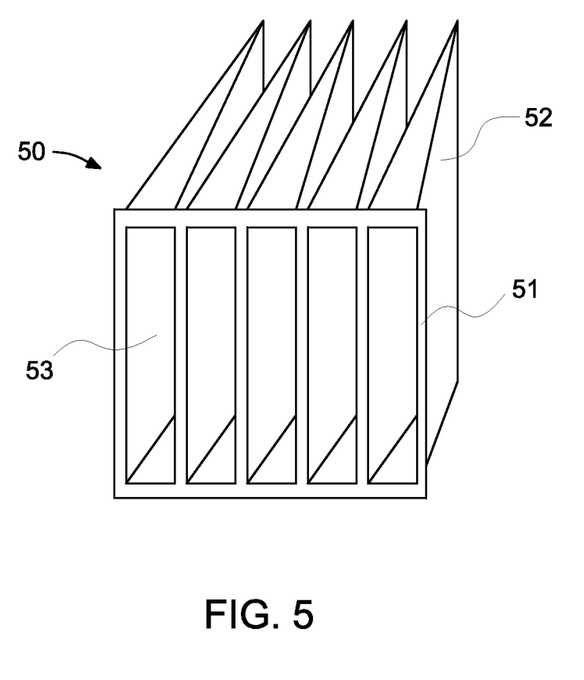
FIG. 5 is a schematic elevation of an embodiment of the invention.

FIG. 5 shows another type of filter that can be used with embodiments of the present invention. This filter 50 is of the bag or pocket type and comprises a frame 51 to which a plurality of bags or pockets 52 are connected. The frame 51 defines a plurality of entrance passages 53 through which incoming air enters the bags/pockets 52. Similarly to the other embodiments, the bags or pockets 52 comprise a plurality of filter media and it is possible to have complete bags or pockets of a particular media or sections of different media "within a single bag or pocket. The bags or pockets 52 can comprise a filter media that is a single layer of 100%) polypropylene fiber material. Other suitable materials may be used, such as a mixture of polypropylene and polyester fibers, and thermally bonded polypropylene or polyester bi-component fibers (and mixtures thereof), as well as other synthetic fibres, such as glass fibre or even natural fibres, such as cotton. The media may be fabricated using any suitable means including but not limited to non-woven; air laid, carded, or needle punch processes. The media may be of any thickness suitable to the particular operating conditions anticipated. In one embodiment the media has an average thickness in the range of about 4 mm (0.157 inch) to 18 mm (0.709 inch). The media may have a uniform density throughout, or it may have a graded density to improve filter life. The fiber material may be inherently hydrophobic or hydrophilic. In one embodiment the fibers are treated to provide hydrophobic properties to the media.

Figure 6A:
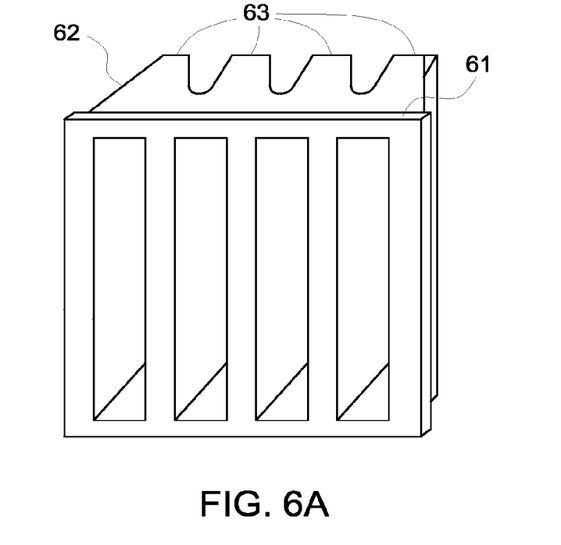
FIGS. 6A, 6B and 6C show a further embodiment of the invention.
Figure 6B:
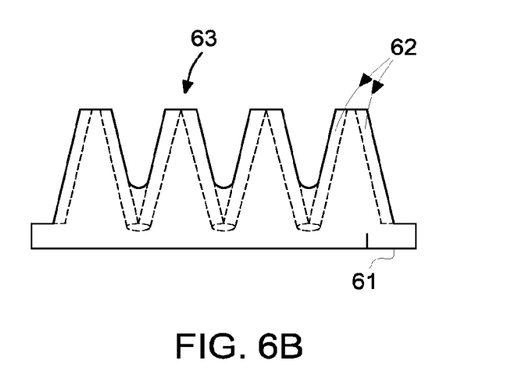
Figure 6C:
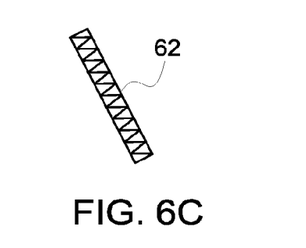

FIG. 6A shows a minipleat filter comprising a frame 61 having a plurality of panels 62 connected thereto. The panels 62 are shown in more detail in FIGS. 6B and 6C. As shown in FIG. 6B, each panel 62 is mounted obliquely to the frame 61 to define a row of generally triangular sections 63. Further, FIG. 6C shows the structure of each panel 62, ie. a pleated sheet of filter media.

Figure 7:
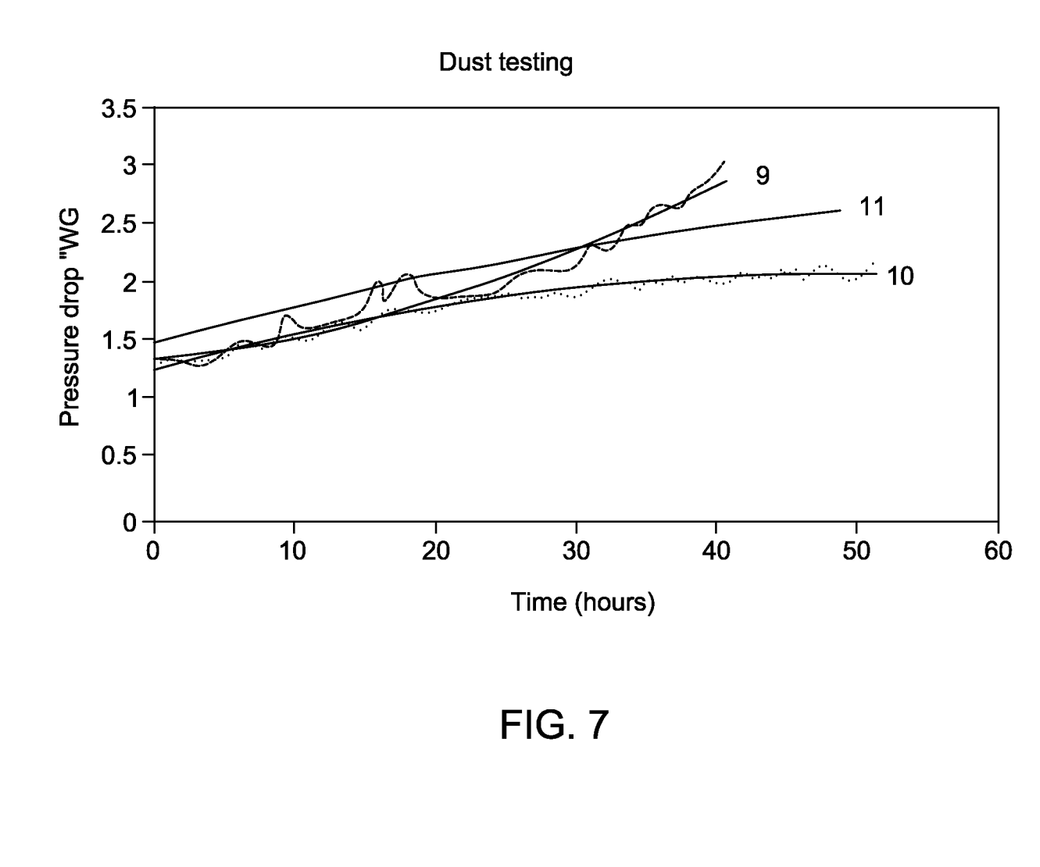
FIG. 7 is a graph showing the filter life performance of the embodiment shown in FIG. 1.
Figure 8:
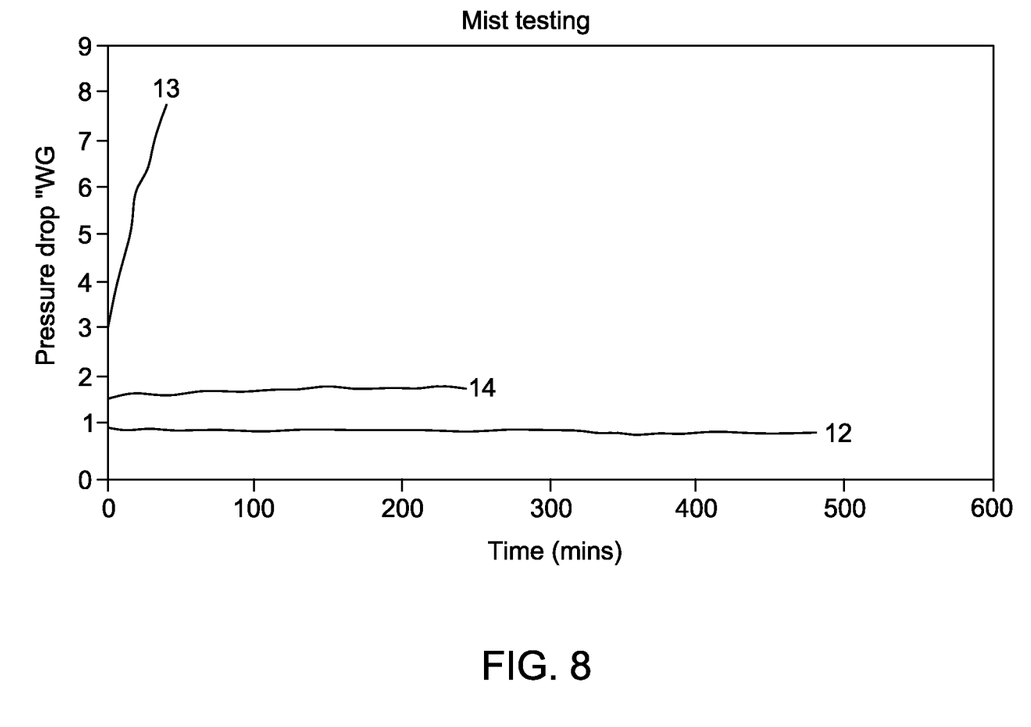
FIG. 8 is a graph showing the filtration performance in moist conditions of the embodiment shown in FIG. 1.

The performance of the embodiment of FIG. 1, as compared to prior art, is shown in the graphs of FIGS. 7 and 8. FIG. 7 shows a graph of pressure drop across the filter against time under dust testing and regular reverse pulse cleaning. Curve 9 (prior art) shows the behaviour of an individual filter using only the second, media, which has a short life, yet maintains a low pressure loss in moist conditions. Curve 10 (prior art) shows the behaviour of an individual filter using only the first media, which has a comparatively long life, high particulate efficiency and poor pressure loss performance in moist conditions. Curve 11 shows the behaviour of the two different media when combined in a parallel arrangement according to the first embodiment of the present invention. Curve 11 shows that the life of the parallel combination of filters advantageously remains close to Curve 10. This indicates that the combination of filters has a filter life performance approaching that of the long life, high efficiency first media.

The particular conditions under which the test of FIG. 7 is carried out are as follows. The filters use a self-clean pulse system which is active and pulses every 7 minutes. Four sets of filters are placed in a wind tunnel and the airflow is set to run at the nominal flow rate for the application, with a minimum relative humidity of 10% RH, in this case the flow rate is 1750 cubic feet per minute (50 cubic meters per minute) per cartridge pair (cylinder and cone). The test dust used is a mixture of 90% Silica of particle size distribution shown in the following table:

| Particle size (microns) | Volume % Smaller Than |
| --- | --- |
| 1 | 2.5-3.5 |
| 2 | 10.5-12.5 |
| 3 | 18.5-22.0 |
| 4 | 25.5-29.5 |
| 5 | 31.0-36.0 |
| 7 | 41.0-46.0 |
| 10 | 50.0-54.0 |
| 20 | 70.0-74.0 |
| 40 | 88.0-91.0 |
| 80 | 99.5-100 |
| 120 | 0 | and 10% NaCl of 0 to 5 micron size (2 micron mean diameter). This test dust is fed continuously at a concentration of 0.57 g per cubic meter of challenge airflow. The pressure loss of the filter system is recorded with respect to time and the graph plotted. The test is run for 50 hours and considered a pass if the pressure loss remains below 3 in wg (747 Pa) for that 50 hour period. As shown in FIG. 7 the inventive filter system passed this filter life test.

FIG. 8 shows a graph of pressure drop across the filter against time under moisture or mist testing. Curve 12 (prior art) shows the performance of the second media used by itself, and the media has low pressure loss even when moist. Curve 13 (prior art) shows the performance of the first media used by itself, and this media has poor pressure loss when moist. Curve 14 shows the performance of the parallel composite filter system according to an embodiment of the present invention. The difference in pressure drop between curve 12 of FIG. 8 and the curve 14 remains largely constant indicating that the performance of the first embodiment of the invention under mist testing conditions approaches that of the second media.

The particular conditions under which the test of FIG. 8 is carried out are as follows. A set of used (i.e. dirty) filters is placed in a closed loop wind tunnel and the airflow is set to run at the nominal flow rate for the application. In this case the flow rate is 1750 ft³/min (CFM) (50 m³/min) per cartridge pair (cylinder and cone). The filters are in a non-pulsing mode of operation. A challenge aerosol of fresh water, with droplet diameter size distribution of 0.7 to 3.5 microns, peaking at 1 micron and fed at a rate of 1 liter/min, is continuously sprayed into the wind tunnel upstream of the filters, and pressure loss across the filters is recorded as a function of time. The relative humidity of the air rapidly approaches 100% for the duration of the test since the wind tunnel is a closed system. The pressure loss across a filter that performs well under moist conditions rises little or even not at all as conditions go from dry to wet, for example, during a fog event.

Additional embodiments of the present invention may address different competing performance requirements and/or enhance the practitioner's ability to design systems suited to a particular operating environment.

In one embodiment the inventive filtration system enables the optimization of pressure loss performance versus particle removal efficiency.

In this embodiment the system will comprise filters having two different efficiency levels, e.g., one low and one extremely high, to create a filter system that offers a medium to high level of efficiency at a level of pressure loss that is between the two filter types. This is particularly relevant when the filtration performance required falls between the top end of one type of media technology and the bottom end of another technology. Such a situation exists with achieving a Hepa H10 or H11 grade of filter. Nano fibre-based media can achieve F9 filtration, but is typically unable to achieve H10 and/or requires high pressure loss to achieve H10 filtration efficiency. In contrast, media utilizing expanded tetrafluoroethylene (ePTFE) membrane can easily achieve high HEPA ratings of H12 and above, but it is very difficult to make the pore sizes in the membrane open enough to provide a lower pressure loss and a filtration grade of H10 or H11. A solution embodying the present invention is to use F9 rated media, such as a nano fibre-based media, and H12 rated media such as an ePTFE membrane-based media together in parallel to achieve H10 or H11 with a reasonable pressure loss.

In another embodiment the inventive filtration system levels the filtration efficiency of the system as dust loading increases over time. When designing an optimum filter system for industrial applications, such as for the air intake to a gas turbine, the performance of the filter system both when it is new and clean and when it is loaded with contaminants through its life needs to be considered. The balance of how filters perform new vs. through life differs with the media technology used. Typically, as dust loads on a filter media the dust cake itself can contribute to the filtration efficiency of the filter. This is true of all filters but the rate at which this change occurs is dependent on the filter media as well as the operating conditions. For example, a media having a nano fibre disposed on a polymer synthetic base material would have a high initial efficiency when new and clean, but as the filter loads, the efficiency of this media would take a relatively long time to build to its maximum efficiency. By contrast, a glass/cellulose blended media would have a low initial efficiency, but its efficiency would increase much more rapidly when loading with dust and so a short while into its life, it reaches its maximum efficiency. By combining these two types of media in a parallel arrangement according to embodiments of the present invention, a more level filtration efficiency throughout the life of the system may be achieved.

In another embodiment the inventive filtration system provides optimized filtration efficiency across a wide spectrum of particle sizes. Similar to the above, a nano fibre/synthetic base media can have a higher particle removal efficiency at small (<2 micron) particle sizes than a blended glass/cellulose media, but the latter will generally have a higher particle removal efficiency at particle sizes between 2 and 5 microns. By combining the two in a parallel configuration according to the present invention, higher filtration efficiency across a wide particle size range may be achieved.

In another embodiment the inventive filtration system comprises both static and pulse filtration elements. This enables the leveraging of the advantages of both pulse and static filtration systems. In many instances, self-cleaning pulse filters are installed solely to provide anti-icing capability of the filters. Previously, the whole filter system would be provided as a pulse filter system to achieve this. A disadvantage of this arrangement is that pulse cartridges are often not the optimum choice when it comes to their filtration properties, but as they are the only choice for anti-icing, their shortcomings from a filtration point of view have to be tolerated. Combining pulsed and static filters into the same stage of filtration, i.e. in parallel, in accordance with embodiments of the present invention, advantageously overcomes this problem since equipment such as a gas turbine often can keep running, even if only a percentage of the filters have been anti-iced, with the rest remaining blocked. In this embodiment of the invention the static filters provide a more optimized filtration solution, while the pulse filters provide a margin of safety against icing.

Embodiments of the present invention provide good, long-lasting performance against particulates and moisture, as well as addressing the other factors mentioned above. By providing independent flow paths through the different media, the media advantageously act in parallel, whereby the system is not limited to the performance of one of the media. Further, since existing media with known performance attributes may be used and combined in a manner to customize the performance of the filtration system to the operating conditions and performance requirements of the particular installation, embodiments of the invention avoid the need for costly and time-consuming development of new media. Embodiments of the invention combine the benefits of the individual media, whilst avoiding many of the disadvantages of each media.

The first and second media are different to one another, and it is possible to incorporate more than two different media in parallel, whereby the overall properties of the system are an advantageous combination of the best individual media properties. The parallel arrangement of the plurality of media means that fluid is filtered through each media simultaneously, such that fluid that passes through one of the media has not passed through the other, in contrast to the prior art serial arrangements of media.

From the above description of at least one aspect of the invention, those skilled in the art will perceive improvements, changes and modifications. Such improvements, changes and modifications within the skill of the art are intended, to be covered by the appended claims.

What is claimed is:

1. A filtration system comprising:
   at least one filter element;
   at least a first and a second filter media that are different to one another and are arranged in a parallel relationship, wherein the first media has a higher particulate removal efficiency than the second media, and the second media has a lower pressure loss across the filter media than the first media, and wherein fluid flow through the filtration system comprises a first fluid flow portion that flows through the first media and a second fluid flow portion that flows through the second media.

2. The filtration system according to claim 1 wherein each filter media is disposed in a respective filter element.

3. The filtration system according to claim 1, wherein at least one filter element includes both the first and second filter media.

4. The filtration system according to claim 1 wherein the first media's performance against a first performance property is superior to that of the second media; and the second media's performance against a second performance property is superior to that of the first media.

5. The filtration system according to claim 1 wherein the first media has a longer life than the second media; and the second media has lower pressure loss after exposure to moisture than the first media.

6. The filtration system according to claim 1, wherein the first media passes a filter life test, the second media does not pass a filter life test, and the filtration system passes a filter life test.

7. The filtration system according to claim 1, wherein the first media takes a longer time to build to its maximum particle filtration efficiency than the second media; and the second media takes a shorter time to build to its maximum particle filtration efficiency than the first media.

8. The filtration system according to claim 1, wherein the first media is a nano fibre polymer based media and the second media is a glass/cellulose blended media.

9. The filtration system according to claim 1, wherein the first media is back-pulsed in operation and the second media is static in operation.

10. A method of optimising performance of a particulate filtration system, the method comprising:
    providing at least one filter element;
    providing at least a first and a second filter media that are different to one another; and arranging the first and second filter media in parallel, wherein the first media has a higher particulate removal efficiency than the second media, and the second media has a lower pressure loss across the filter media than the first media, and wherein fluid flow through the filtration system comprises a first fluid flow portion that flows through the first media and a second fluid flow portion that flows through the second media.

11. The method according to claim 10, wherein the first media's performance against a first performance property is superior to that of the second media; and the second media's performance against a second performance property is superior to that of the first media.

12. The method according to claim 10 wherein the first media has a longer life than the second media; and the second media has lower pressure loss after exposure to moisture than the first media.

13. The method according to claim 10 wherein the first media passes a filter life test, the second media does not pass a filter life test, and the filtration system passes a filter life test.

14. The method according to claim 10 wherein the first media takes a longer time to build to its maximum particle filtration efficiency than the second media; and the second media takes a shorter time to build to its maximum particle filtration efficiency than the first media.

15. A gas turbine comprising an inlet for receiving air and a filtration system through which the air is filtered, the filtration system comprising
    at least one filter element;

at least a first and a second filter media that are different to one another and are arranged in a parallel relationship, wherein the first media has a higher particulate removal efficiency than the second media, and the second media has a lower pressure loss across the filter media than the first media, and wherein fluid flow through the system comprises a first fluid flow portion that flows through the first media and a second fluid flow portion that flows through the second media.

* * * * *